(12) United States Patent
Elwin et al.

(10) Patent No.: US 12,552,011 B2
(45) Date of Patent: Feb. 17, 2026

(54) METHOD AND SYSTEM FOR MULTIROBOT COLLABORATIVE MOBILE MANIPULATION

(71) Applicant: Northwestern University, Evanston, IL (US)

(72) Inventors: Matthew Lawrence Elwin, Chicago, IL (US); Billie Jane Strong, Evanston, IL (US); Kevin M. Lynch, Evanston, IL (US); Randy A. Freeman, Mount Prospect, IL (US)

(73) Assignee: Northwestern University, Evanston, IL (US)

( * ) Notice: Subject to any disclaimer, the term of this patent is extended or adjusted under 35 U.S.C. 154(b) by 123 days.

(21) Appl. No.: 18/526,504

(22) Filed: Dec. 1, 2023

(65) Prior Publication Data

US 2024/0181627 A1  Jun. 6, 2024

Related U.S. Application Data

(60) Provisional application No. 63/385,645, filed on Dec. 1, 2022.

(51) Int. Cl.
*B25J 5/00* (2006.01)
*B25J 9/16* (2006.01)
(Continued)

(52) U.S. Cl.
CPC ............ *B25J 5/007* (2013.01); *B25J 9/1664* (2013.01); *B25J 13/085* (2013.01); *B25J 15/0019* (2013.01)

(58) Field of Classification Search
CPC ... B25J 9/0054; B25J 5/00; B25J 5/007; B25J 9/1664; B25J 15/0019; B25J 13/00;
(Continued)

(56) References Cited

U.S. PATENT DOCUMENTS 10,059,007 B1 * 8/2018 O'Connor ............ B25J 15/0266
11,318,603 B2 * 5/2022 Handfest ................ B25J 9/0051
(Continued)

OTHER PUBLICATIONS

D. J. Agravante, A. Cherubini, A. Bussy, P. Gergondet, and A. Kheddar, "Collaborative human-humanoid carrying using vision and haptic sensing," in IEEE International Conference on Robotics and Automation, 2014; pp. 607-612.
(Continued)

*Primary Examiner* — Khoi H Tran
(74) *Attorney, Agent, or Firm* — Bell & Manning, LLC

(57) ABSTRACT

A robot system includes a plurality of mobile manipulator robots, where each mobile manipulator robot includes a mobile robot base, a robot manipulator mounted to the mobile robot base, and one or more computers in communication with the mobile robot base and the robot manipulator. The robot manipulator includes an end-effector that incorporates passive compliance due to spring elements at one or more joints of the robot manipulator. The one or more computers coordinate motion control of the mobile robot base and force control at the end-effector of the robot manipulator to manipulate a payload in cooperation with other mobile manipulator robots of the plurality, while collaborating with zero, one, or a plurality of human users that are in contact with the payload.

17 Claims, 12 Drawing Sheets

(51) Int. Cl.
B25J 13/08 (2006.01)
B25J 15/00 (2006.01)

(58) Field of Classification Search
CPC ...... B25J 9/1633; B25J 13/085; B25J 9/1638; B25J 9/1641
USPC ........................................................ 700/245
See application file for complete search history.

(56) References Cited

U.S. PATENT DOCUMENTS

| | | | | |
|---|---|---|---|---|
| 11,638,995 | B2* | 5/2023 | Abdallah | B25J 9/1633 700/245 |
| 11,794,345 | B2* | 10/2023 | Smith | B25J 9/0006 |
| 12,226,892 | B2* | 2/2025 | Vulliez | B25J 13/025 |
| 2011/0129323 | A1* | 6/2011 | Ehrat | B25J 17/0266 414/738 |
| 2014/0083231 | A1* | 3/2014 | Sutherland | B25J 5/007 180/218 |
| 2016/0107778 | A1* | 4/2016 | Last | B65G 47/905 211/49.1 |
| 2016/0332305 | A1* | 11/2016 | Gonzalez | B25J 13/025 |
| 2017/0157776 | A1* | 6/2017 | Gosselin | B25J 13/02 |
| 2017/0173792 | A1* | 6/2017 | Takano | B25J 13/088 |
| 2020/0147784 | A1* | 5/2020 | Crawford | F16H 21/54 |
| 2020/0214779 | A1* | 7/2020 | Masuda | G05B 19/056 |
| 2020/0339350 | A1* | 10/2020 | Dooley | B65G 65/02 |
| 2021/0362321 | A1* | 11/2021 | Olsson | B25J 9/0051 |
| 2022/0219319 | A1* | 7/2022 | Khajepour | B25J 9/0051 |
| 2023/0063977 | A1* | 3/2023 | Moghadam | A61F 2/2418 |
| 2023/0256590 | A1* | 8/2023 | Tadano | A61B 90/50 700/247 |
| 2023/0311337 | A1* | 10/2023 | Vulliez | B25J 9/1689 700/264 |
| 2024/0066689 | A1* | 2/2024 | Moghadam | B25J 9/0015 |
| 2025/0058469 | A1* | 2/2025 | Zhang | B25J 9/162 |

OTHER PUBLICATIONS

D. J. Agravante, A. Cherubini, A. Sherikov, P.-B. Wieber, and A. Kheddar, "Human-humanoid collaborative carrying," IEEE Transactions on Robotics, vol. 35, No. 4, pp. 833-846, Aug. 2019.

E. Berger, D. Vogt, N. Haji-Ghassemi, B. Jung, and H. B. Amor, "Inferring guidance information in cooperative human-robot tasks," in 2013 13th IEEE-RAS International Conference on Humanoid Robots (Humanoids), Oct. 2013, pp. 124-129.

E. Berger, M. Sastuba, D. Vogt, B. Jung, and H. Ben Amor, "Dynamic mode decomposition for perturbation estimation in human robot interaction," in the 23rd IEEE International Symposium on Robot and Human Interactive Communication, Aug. 2014, pp. 593-600.

A. Bussy, A. Kheddar, A. Crosnier, and F. Keith, "Human-humanoid haptic joint object transportation case study," in IEEE/RSJ International Conference on Intelligent Robots and Systems, 2012; pp. 3633-3638.

D. D. Carli, E. Hohert, C. A. C. Parker, S. Zoghbi, S. Leonard, E. Croft, and A. Bicchi, "Measuring intent in human-robot cooperative manipulation," in IEEE Workshop on Haptic Audio Visual Environments and Games, 2009; pp. 1-6.

P. Evrard and A. Kheddar, "Homotopy switching model for dyad haptic interaction in physical collaborative tasks," in World Haptics, 2009; pp. 1-6.

K. Kosuge, M. Sato, and N. Kazamura, "Mobile robot helper," in IEEE International Conference on Robotics and Automation, 2000; pp. 583-588.

J. Lanini, H. Razavi, J. Urain, and A. Ijspeert, "Human intention detection as a multiclass classification problem: application in physical human-robot interaction while walking," Robotics and Automation Letters, vol. 3, No. 4, pp. 4171-4178, Oct. 2018.

M. Lawitzky, A. Mortl, and S. Hirche, "Load sharing in human-robot cooperative manipulation," in 19th International Symposium in Robot and Human Interactive Communication, Sep. 2010, pp. 185-191.

A. Mortl, M. Lawitzky, A. Kucukyilmaz, M. Segin, C. Basdogan, and S. Hirche, "The role of roles: physical cooperation between humans and robots," International Journal of Robotics Research, vol. 31, No. 13, pp. 1656-1674, 2012.

A. Giammarino, J. M. Gandarias, P. Balatti, M. Leonori, M. Lorenzini, and A. Ajoudani, "Super-man: Supernumerary robotic bodies for physical assistance in human-robot conjoined actions," 2022, https://arxiv.org/abs/2201.06365.

S. Nikolaidis, A. Kuznetsov, D. Hsu, and S. Srinivasa, "Formalizing human-robot mutual adaptation: a bounded memory model," in Human-Robot Interaction, 2016; pp. 75-82.

Y. Ren, S. Sosnowski, and S. Hirche, "Fully distributed cooperation for networked uncertain mobile manipulators," IEEE Transactions on Robotics, vol. 36, No. 4, pp. 984-1003, Aug. 2020.

D. Sieber, S. Music, and S. Hirche, "Multi-robot manipulation controlled by a human with haptic feedback," in IEEE/RSJ International Conference on Intelligent Robots and Systems, 2015; pp. 2440-2446.

J. Stuckler and S. Behnke, "Following human guidance to cooperatively carry a large object," in 2011 11th IEEE-RAS International Conference on Humanoid Robots, Oct. 2011, pp. 218-223.

Z. Wang and M. Schwager, "Force-amplifying n-robot transport system (force-ants) for cooperative planar manipulation without communication," The International Journal of Robotics Research, vol. 35, No. 13, pp. 1564-1586, 2016. [Online]. Available: https://doi.org/10.1177/0278364916667473.

K. Yokoyama, H. Handa, T. Isozumi, Y. Fukase, K. Kaneko, F. Kanehiro, Y. Kawai, F. Tomita, and H. Hirukawa, "Cooperative works by a human and humanoid robot," in IEEE International Conference on Robotics and Automation, 2003; pp. 2985-2991.

Gill A. Pratt et al., "Series Elastic Actuators," MIT Artificial Intelligence Laboratory and Laboratory for Computer Science; 1995 IEEE pp. 399-406.

* cited by examiner

| # Omnids | end-effector configuration | payload manipulability |
|---|---|---|
| 1 | no constraints | $\text{rank}(F_p(q)) = 3$ |
| 2 | not collocated | $5 \leq \text{rank}(F_p(q)) \leq 6$ |
| 3 | not collinear | $6 \leq \text{rank}(F_p(q)) \leq 9$ |

Fig. 3A

| | |
|---|---|
| SEA max continuous torque | 9 Nm |
| SEA stiffness | 60.1 Nm/rad |
| Delta proximal link length | 0.200 m |
| Delta distal parallelogram linkage length | 0.368 m |
| Joint limits at each proximal joint $\theta_i$ | $[-15°, 100°]$ |
| Joint angles $\theta_i$ at home | 38.6° |
| End-effector $(x, y, z)$ position at home | $(0, 0, 0.420 \text{ m})$ |
| Radius of workspace-inscribed sphere about home | 0.15 m |
| End-effector max continuous force at home | 90 N |
| End-effector linear stiffness $K_{xx}, K_{yy}, K_{zz}$ at home | 1400 N/m |
| End-effector linear stiffness $K_{zz}$ at home | 2000 N/m |
| Theoretical end-effector position resolution at home | 0.3 μm |
| Theoretical end-effector force resolution at home | 500 μN |

Fig. 3B

METHOD AND SYSTEM FOR MULTIROBOT COLLABORATIVE MOBILE MANIPULATION

CROSS-REFERENCE TO RELATED APPLICATION

The present application claims the priority benefit of U.S. Provisional Patent App. No. 63/385,645 filed on Dec. 1, 2022, the entire disclosure of which is incorporated herein by reference.

BACKGROUND

Robots refer to machines which are generally programmable by a computer and that are designed to carry out a series of actions automatically. Robots can be autonomous or semi-autonomous, and come in a variety of form factors such as humanoid, arms, probes, toys, vacuum cleaners, etc. Robots can be used in a variety of scenarios and environments to help humans perform tasks. For example, robots can be used in military operations, in medical operations (e.g., surgery), in industrial applications such as automobile manufacturing, in serving operations (e.g., restaurants), etc.

SUMMARY

An illustrative robot system includes a plurality of mobile manipulator robots, where each mobile manipulator robot includes a mobile robot base, a robot manipulator mounted to the mobile robot base, and one or more computers in communication with the mobile robot base and the robot manipulator. The robot manipulator includes an end-effector that incorporates passive compliance due to spring elements at one or more joints of the robot manipulator. The one or more computers coordinate motion control of the mobile robot base and force control at the end-effector of the robot manipulator to manipulate a payload in cooperation with other mobile manipulator robots of the plurality, while collaborating with zero, one, or a plurality of human users that are in contact with the payload.

In one embodiment, each robot manipulator includes a Delta robot. In another embodiment, each actuated joint of each Delta robot is driven by a series-elastic actuator. In another embodiment, each series-elastic actuator includes a pair of antagonistic springs connecting an actuator-driven yoke to a link of the Delta manipulator. In another embodiment, an encoder-instrumented unactuated gimbal with three degrees of freedom is mounted to the Delta robot.

In another embodiment, each mobile robot base comprises a wheeled robot base, and in some embodiments the wheeled robot base comprises an omnidirectional wheeled robot base. In another embodiment, the mobile manipulator robots communicate wirelessly with each other or a central control station. In another embodiment, each mobile robot base is configured to sense its position and orientation.

An illustrative robot manipulator includes a Delta robot, where each actuated joint of the Delta robot is driven by an actuator incorporating one or more spring elements. The robot manipulator also includes one or more computers in communication with the Delta robot and configured to measure and control translational forces in a frame fixed to a moving output platform of the Delta robot. The robot manipulator also includes an encoder-instrumented unactuated gimbal with three degrees of freedom mounted to the moving output platform of the Delta robot. In an illustrative embodiment, the Delta robot is mounted to a mobile robot base, where the mobile robot base is an omnidirectional wheeled mobile robot.

An illustrative method of controlling a mobile manipulator robot includes simultaneously achieving, by a computing system, a desired linear force in a frame fixed to an output platform of a Delta robot while driving a mobile base to keep the output platform of the Delta robot as close as possible to a center of its workspace.

The method can also include determining, by the computing system, forces to be applied to a payload by the plurality of mobile manipulator robots collectively to cause the payload to feel weightless to one or more human users contacting the payload. The method can also include collectively estimating, by the mobile manipulator robots, a mass and one or more inertial properties of a payload that is to be manipulated. The method can also include collectively estimating, by the mobile manipulator robots, relative configurations of their end-effectors in contact with a payload that is to be manipulated. In some embodiments, the computing system comprises a central control station. In another embodiment, the method includes determining, by the computing system, a position and an orientation of the mobile base. The encoder-instrumented unactuated gimbal can have three degrees of freedom. In another embodiment, each actuated joint of each Delta robot is driven by a series-elastic actuator.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3A depicts payload manipulability as a function of the number of Omnids grasping the payload and the configurations of their end-effectors in accordance with an illustrative embodiment.

FIG. 3B is a table that depicts physical properties of the Omnid Delta manipulator and its theoretical position and force capabilities at the home configuration in accordance with an illustrative embodiment.

DETAILED DESCRIPTION

Introduction

Figure 1:
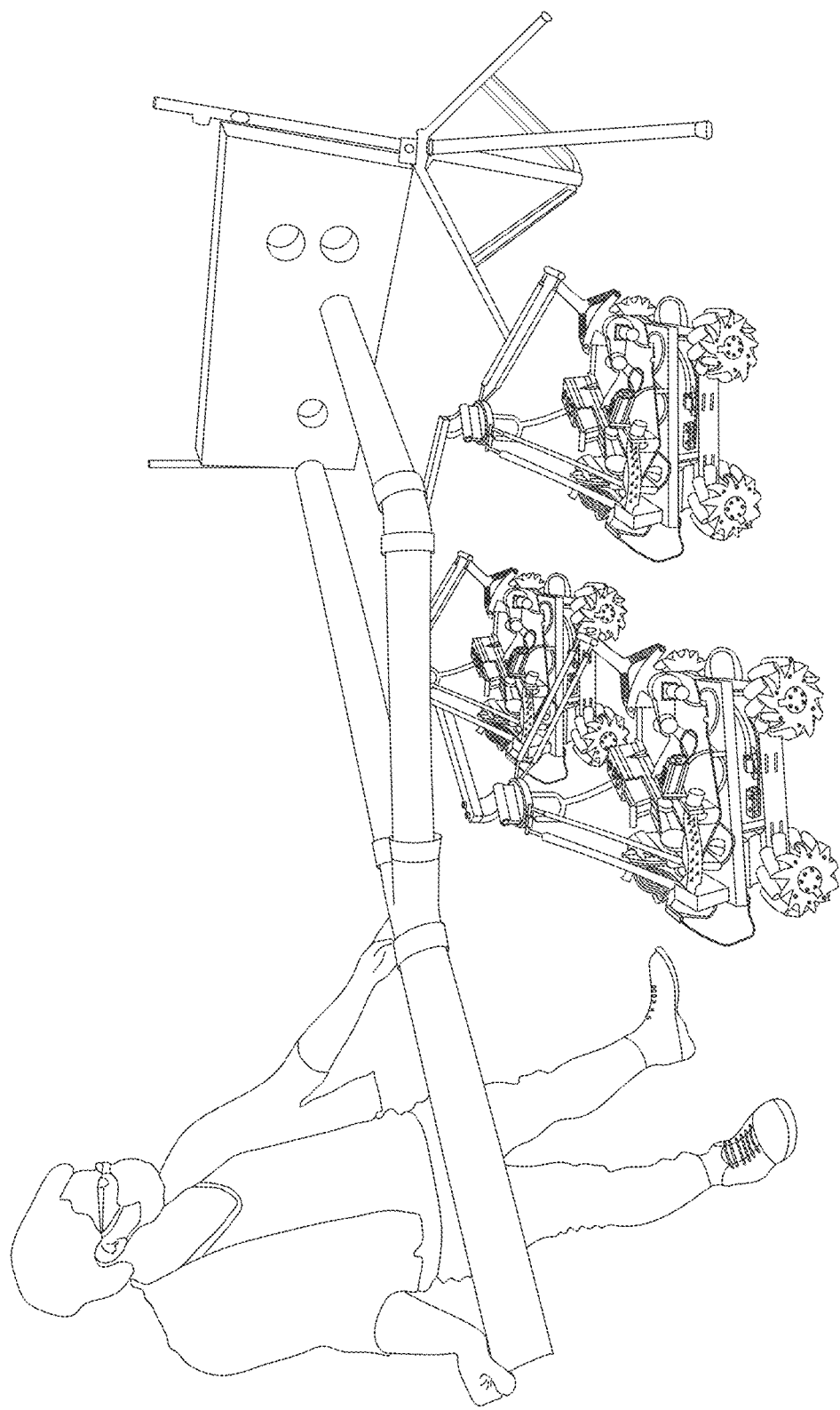
FIG. 1 depicts a human and three Omnid mocobots performing 6-degrees-of-freedom collaborative assembly of a bulky payload into a fixture in accordance with an illustrative embodiment.

A robot is a mechanical device capable of moving with a plurality of degrees of freedom, based on motions, forces, or torques generated by actuators following commands from one or more control systems, implemented in computer software, that operate on data from sensors (e.g., encoders, force-torque sensors, accelerometers, IMUs, vision sensors, laser rangefinders, and many others) and other data and input. A robot may be a robot manipulator (an "arm") that moves its end-effector relative to the fixed base of the robot. It can also be a wheeled robot, a legged robot such as a humanoid or dog-like robot, a flying robot, an underwater robot, combinations of these, or many other possibilities. Robots are used in a wide variety of applications.

A cobot, or collaborative robot, is a particular type of robot that is specifically designed for safe physical interaction with one or more human users. An example is a human and a cobot collaboratively carrying common payload, such as a table. Cobots may also operate in an autonomous mode, like a typical robot, without any direct interaction with a human.

When multiple robots work together on a manipulation task, it can be referred to herein as cooperative or collective manipulation. An example is multiple robots cooperatively manipulating a single payload. One or more cobots simultaneously manipulating a payload with one or more humans can be referred to as collaborative manipulation. Human-multirobot collaborative manipulation refers specifically to the case where multiple cobots are involved in the collaboration.

The advantages of human-cobot collaborative manipulation have been recognized in the past. Human-cobot collaborative manipulation takes advantage of humans' intelligence, situational awareness, adaptability, and sensory capabilities and the cobots' strength, precision, complementary sensing, and artificial intelligence.

Most prior work on human-cobot collaborative manipulation considers a single cobot collaborating with a single human. However, human-cobot collaborative manipulation of large, flexible, or fragile payloads requires contacts distributed over the payload. To achieve this, multiple independent cobots, cooperating together, may provide contact forces at different locations on the payload. This avoids damaging stress concentrations at localized contacts; allows multiple cobots to share the load; offers the possibility to use the same cobot model for small and large payloads by simply increasing the number of cobots recruited for tasks involving larger payloads; and allows control of internal degrees of freedom of flexible and articulated payloads. Accordingly, this invention is directed toward a system and method for multiple mobile manipulator cobots, or "mocobots," to assist one or more humans in manipulating large payloads, with applications in construction, factory assembly, warehouses, military logistics, and more.

Definitions

The definitions given below summarize meanings of certain terms used throughout the description. Most of these definitions follow typical practice in the field of robotics, for example following references such as the textbook "Modern Robotics: Mechanics, Planning, and Control," Lynch and Park, Cambridge University Press 2017.

Joints, Actuators, and Control

Robots are often articulated at joints. Common joints include revolute joints, which allow one degree-of-freedom of rotational motion, and prismatic joints, which allow one degree-of-freedom of translational motion. Other common joints include universal joints, which allow two degrees of rotation, and spherical (or ball-and-socket) joints, which allow three degrees of freedom of rotation.

Motors generate motions, forces, or torques that drive joints of a robot. A typical motor takes a power input (e.g., voltage and current for an electric actuator) and converts it to useful mechanical power (e.g., velocity and force or torque) to drive one or more joints. An amplifier is an interface between a computer and a motor that receives low-power digital or analog signals from the computer—often specifying a desired position, velocity, force, or torque—and generates corresponding high power to the input of the motor. This amplifier may sense—or take as input sensor signals on—the motor's position, velocity, force, or torque, and implement a feedback control loop to better control the motor's position, velocity, force, or torque. The output of the motor may be connected to a transmission with the purpose of carrying the power over large distances (e.g., tendons or belts): converting between a linear motion and an angular motion (e.g., rack and pinion, lead screw or ball screw; or other linkage); and/or transforming the force/torque and velocity without changing power, typically by increasing the force/torque and decreasing the velocity. Common methods for this transformation are gears, belts, and pulleys.

An actuator may be defined to be a motor, or a motor plus an amplifier, or a motor plus a transmission, a motor plus an amplifier and a transmission, or any of these combinations plus one or more sensors, such as an encoder. The latter examples treat the combination of components as a single unit.

A joint can be unactuated or actuated. An unactuated joint has no actuator directly associated with it, though it may have spring or damper elements. This type of joint is also called passive. In contrast, an actuated joint has one or more actuators that directly drive the joint.

An actuated joint is typically controlled in a feedback loop, where a computer reads one or more sensors associated with the joint (for example, an encoder measuring the position of the joint, or a force-torque sensor measuring forces or torques applied by the actuator) and then commands a position, velocity, force, or torque to the actuator. An example frequency for this control loop is 1000 Hertz (Hz), but other choices are possible. A joint which is both actuated and controlled in a feedback loop is called actively controlled.

In general, a controller's ability to drive a joint to track a desired time-varying behavior (e.g., the desired position, force, or torque as a function of time) degrades with increasing frequency of the time-varying behavior. For example, a controller may be able to drive an actuated revolute joint to closely follow a desired sinusoidal motion of 5 degrees in amplitude when the frequency of the sinusoid is low, such as 0.1 Hz, but when the desired frequency is 100 Hz, the tracking may be poor. The ability of an actively-controlled joint to track a desired time-varying behavior can be characterized by a bandwidth, roughly defined as the maximum frequency at which the tracking performance is considered acceptable. Bandwidth depends on factors such as the mass and rigidity of the robot, the quality of the sensors and actuators, the quality of the control algorithm, the frequency of the control loop, and others.

For example, a controller may be constructed to try to cause an actuated revolute joint to emulate a torsional stiffness K. When the joint is displaced an angle Q by an external source, the joint torque T created by the actuator should equal $T_{desired}$, Where $T_{desired}$=-K Q.

An example sinusoidal imposed displacement is Q=A sin (2 πft), where the amplitude is A=0.1 radians. For low frequencies, such as f=0.1 Hz, the actively-controlled joint may provide a time-varying torque T(t) closely tracking $T_{desired}(t)$. At higher frequencies, such as f=100 Hz, the torque tracking performance is significantly degraded. As an example, the maximum frequency at which the torque tracking performance is considered acceptable (the bandwidth) might be 10 Hz.

Some actuators are designed to incorporate one or more springs, so that an actively-controlled joint exhibits passive spring-like behavior, even when the actuator is not powered. One example of such an actuator is a series-elastic actuator. A series-elastic actuator typically includes a geared motor driving one end of a linear or torsional spring element while the other end of the spring is connected to the actuator output. The displacement between the two ends of the spring element can be measured by encoders or other means. The measured displacement, plus the known stiffness properties of the spring, allows the force or torque produced by the actuator to be estimated. One advantage of this arrangement is that the behavior of the joint is well characterized by the passive stiffness of the spring $K_{spring}$ at frequencies of the imposed displacement Q beyond the limited bandwidth where active control is effective at emulating spring-like behavior. The passive spring protects the motor from shocks at the output and protects a human who interacts with the joint either directly or indirectly through a mechanism incorporating the joint.

In addition to series-elastic actuators, there are other types of actuators incorporating spring elements. Two examples are variable stiffness actuators and variable impedance actuators, which allow adjustment of the passive spring constant.

Robot Topology and Configuration

The topology of the links and joints of a robot may follow one of several plans, including serial open chain robot, where the joints connect links in a single serial chain (for example, the human arm from the shoulder, and not including the hand): branched chain robot (for example, the hand with its fingers, or the entire human body with its arm and leg branches, or a car with its wheels); closed chain robot, where the links and joints form one or more closed loops; and parallel robot, a specific type of closed-chain robot with a fixed base platform, an output platform, and a plurality of largely identical actuated legs connecting the two. An example is the Stewart platform robot, where each of the six legs has an actuated prismatic joint and two unactuated joints: a spherical joint and either a universal joint or a second spherical joint. Stewart platforms are used in some motion simulators.

Closed chains generally must have both unactuated and actuated joints to ensure the kinematic consistency of the mechanism. Serial open chains and branched chains often only have actuated joints.

One well known type of parallel robot is the Delta robot. A Delta robot includes a fixed base platform and a moving output platform actively controlled in three degrees of freedom through three identical legs. Each leg includes revolute joints and a parallelogram linkage with spherical joints configured to ensure that the output platform moves in three translational degrees of freedom (x, y, z) when one revolute joint per leg is directly actuated. All other joints of the legs are unactuated. In some variants of the Delta robot, a fourth actuator controls one rotational degree of freedom of the moving output platform.

The configuration of a robot is a complete description of its location in space. For a robot arm with a fixed base, the configuration is typically a list of joint positions sufficient to fully specify the location of the robot. For a mobile robot, the configuration includes a specification of the location in space of the mobile robot's chassis.

Robot Manipulators and Control

A robot manipulator may be constructed as a serial open chain, branched chain, closed chain, or parallel mechanism. A robot manipulator has a fixed base and a moving end-effector, where the robot makes contact with the payload it is manipulating. An end-effector could be a gripper, a robot hand, a suction cup, a fixture that attaches to the payload, or other device that allows the robot manipulator to make contact with the payload. An end-effector frame is a coordinate frame fixed relative to the end-effector.

The workspace of a robot manipulator refers to the configurations achievable by the end-effector frame relative to its fixed base.

The behavior of the robot at its end-effector is critical to its ability to manipulate. Characteristics of the robot at its end-effector include the number of actively-controlled degrees of freedom, the number of unactuated degrees of freedom, payload force capabilities, end-effector speed, and many others. Of particular interest is the apparent end-effector stiffness to external disturbances. For small disturbances, the stiffness apparent in a frame fixed to the end-effector is expressed as a 6×6 positive-definite matrix K satisfying F(t)=K X(t), where F(t) is a 6-vector of torques and forces (sometimes referred to as a wrench, or simply as a force) applied to the end-effector and X(t) is a 6-vector displacement of the end-effector (e.g., expressed in exponential coordinates). Treating X(t) as an external disturbance, the effective value of K may depend on the configuration of the manipulator and the frequency content of the disturbance X(t): at low frequencies. K may be determined by the actively-controlled stiffnesses at the joints, while at high frequencies K may be determined by the passive spring elements at the joints. The end-effector compliance is the inverse of the stiffness, $C=K^{-1}$. Passive compliance (or unactuated compliance) refers to end-effector compliance due to spring elements in the manipulator. Active compliance refers to compliance generated by a feedback controller, with its limited bandwidth.

The robot end-effector can be actively controlled in a variety of ways, including force control, motion control, and stiffness control. In force control, the controller attempts to create the desired force at the end-effector, without concern for the motion or stiffness at the end-effector. In motion control, the controller attempts to drive the end-effector along a desired trajectory or to a particular configuration, without concern for the force or stiffness at the end-effector. In stiffness control, the controller attempts to create the desired stiffness at the end-effector without concern for the force or motion at the end-effector.

Mobile Robot Bases and Mobile Manipulator Robots

A mobile robot is a robot that uses wheels, legs, tracks, propellers, or other means to move its chassis in space, in contrast to a fixed-base robot. A wheeled mobile robot moves over ground through the use of wheels. An omnidirectional wheeled mobile robot is a wheeled mobile robot whose chassis can instantaneously move in any direction over ground, i.e., any combination of translation in two planar directions and rotation about an axis perpendicular to the ground. This is in contrast to a car, for example, that cannot move directly to the side: this type of motion can only be approximated by using parallel-parking maneuvers. Omnidirectionality is often, but not always, achieved using special wheels with free-rolling rollers mounted on their outer circumferences, such as mecanum wheels and omni-wheels.

A mobile robot base is a mobile robot on which items may be mounted, such as a robot manipulator. A mobile manipulator robot comprises one or more robot manipulators mounted on a mobile robot base.

Description of the Invention

Described herein is the design and control of a robot system including two or more mobile manipulator robots that are capable of manipulating a payload in collaboration with one or more human users who guide the manipulation by contacting the payload. The system is motivated by manipulation tasks with the following characteristics: the payload is large, heavy, or awkward, making manipulation of the payload challenging for humans alone; the manipulation benefits from multiple contacts distributed over the payload (for example, to avoid stress concentrations for fragile payloads, to control additional degrees of freedom of flexible or articulated payloads, or to allow sharing of the load by multiple robots); and fully automating the manipulation is difficult or impractical. The human-robot system takes advantage of the humans' intelligence, situational awareness, adaptability, and sensory capabilities and the robots' strength, precision, complementary sensing, and artificial intelligence. For tasks which can be made autonomous, such a robot system would also be capable of cooperative autonomous manipulation without physical human collaboration.

In human-robot collaborative manipulation, the safety of the human(s) is paramount. One requirement for safety is that the robot end-effectors exhibit significant passive compliance, i.e., natural springy behavior. This passive compliance, being purely mechanical in nature, is not subject to the limited bandwidth of active feedback control. In case of impact between a human and the end-effector, or a human and the payload being manipulated, this significant passive compliance is apparent, and very different from the low passive compliance of a typical industrial robot manipulator, which is typically intended for high quality motion control and not for interaction with humans. Added benefits of passive compliance at an end-effector include: (1) it may facilitate force control of the end-effector and (2) it protects fragile payloads from damage. A disadvantage of passive compliance at the end-effector is that it generally reduces the bandwidth of active motion control. This is not a significant concern for many forms of human-robot collaborative manipulation, however.

Another desired feature for a system of mobile manipulator robots for human-robot collaboration is high quality force control at the end-effectors of the manipulators. This allows the end-effectors to smoothly and effectively share the load of the payload, even when their mobile bases are subject to disturbances in their motions. In other words, the robot manipulators and their control systems should be designed for high quality force control, not necessarily high quality motion control.

Other requirements for a system of mobile manipulator robots for human-robot collaboration include: (1) the mobile manipulator robots should be capable of providing enough force at their end-effectors to support the weight of the payload (note that this depends on the mass of the payload, the center of mass of the payload, and the locations on the payload at which the end-effectors make contact), and (2) the mobile manipulator robots should provide enough controlled degrees of freedom at their end-effectors to effectively manipulate the degrees of freedom of the payload. If the payload is largely rigid, the mobile manipulator robots need to provide at least six controlled degrees of freedom at their end-effectors (corresponding to the payload's x-y-z-roll-pitch-yaw motions). If the payload is articulated or flexible, the robots need more than six controlled degrees of freedom at their end-effectors to manipulate the extra degrees of freedom due to articulation or flexibility.

To meet the requirements outlined above, a number of mobile manipulator robots can be recruited to assist with a particular collaborative manipulation task, where the number of robots increases with the size or weight of the payload. Thus a large payload does not necessarily require a larger type of mobile manipulator robot: instead, a larger number of a standard-sized mobile manipulator robot can be recruited than would be used for a smaller, lighter payload. The contacts between the end-effectors and the payload can be distributed over the payload, reducing stress concentrations and offering the possibility to control extra degrees of freedom due to articulation or flexibility of the payload.

In an illustrative embodiment, each mobile manipulator robot of the proposed system can include a mecanum-wheel omnidirectional mobile base, a series-elastic-driven Delta-type parallel manipulator, and an encoder-instrumented unactuated gimbal. This particular type of mobile manipulator robot is called an Omnid. The Omnid robots are a specific implementation of a broader class of 'mobile collaborative robots' ("mocobots" for short) suitable for safe human-collaborative manipulation of large, heavy, awkward, delicate, flexible, or articulated payloads. Key features of the proposed mocobots include passive compliance, for the safety of the human and the payload, and high-fidelity end-effector force control independent of the potentially imprecise motions of the mobile base.

In one embodiment, the Omnid mocobots are designed specifically for team mobile manipulation, including autonomous cooperative manipulation and manipulation in collaboration with one or more human partners. FIG. 1 depicts a human and three Omnid mocobots performing 6-degrees-of-freedom collaborative assembly of a bulky payload into a fixture in accordance with an illustrative embodiment. The system is particularly relevant to tasks with the following characteristics: (a) the payload is large and it is impractical for a single robot to manipulate it: (b) to implement the task it is advantageous to distribute contact forces over the payload, to minimize stress concentrations on a delicate payload, or to control all the degrees of freedom of an articulated or flexible payload; and (c) the task is unique or difficult to automate, requiring the adaptability and situational awareness of one or more human collaborators. Even in embodiments in which the tasks are completely automated and performed solely by robots, a human-collaboration phase can be useful for human-guided machine learning.

Human-robot communication during collaboration can be verbal, visual, or physical, but the focus of the present application is on physical human-robot interaction through the payload because the direct haptic interaction provides the human a high bandwidth and intuitive communication channel for manipulation tasks. In an illustrative embodiment, the mocobots also communicate with each other mechanically through the payload, and the examples described herein primarily focus on physical communication through the payload. In alternative embodiments, other types of communication among the robots and between the humans and robots can be used to facilitate other capabilities.

For the safety of the human and the payload, mocobots are designed to provide passive mechanical compliance to compensate for the limited bandwidth of active impedance and force controllers. Mocobots should also provide sufficient manipulability of the payload to enable effective autonomous or human-collaborative manipulation. Described herein are these and other design requirements for a team of mocobots. Also included herein is an explanation of how the design of the Omnids, with their omnidirectional mobile bases and series-elastic parallel manipulators, satisfies these requirements. Controllers that facilitate useful human-collaborative behaviors are also described, along with experiments where the Omnids render large payloads weightless for easy collaborative manipulation by one or more human partners.

The proposed multi-mocobot system has capabilities that have not been demonstrated by any previous collaborative mobile manipulator team. As discussed above, in one embodiment, the proposed Omnid mocobots can be designed to work with one or more humans to physically co-manipulate a payload with the following features. First, the payload manipulation occurs in three-dimensional space. Second, the co-manipulation can be performed by any number of mocobots beyond a minimum number (e.g., three for the Omnids) to (i) distribute the forces on the payload to avoid stress concentrations, (ii) achieve sufficiently large forces to support the payload, and/or (iii) control payload internal degrees of freedom. Third, the mocobots provide high-fidelity active force control as well as passive compliance, which enhances the safety of the humans and the safety of fragile payloads to disturbances and transient control errors. Fourth, the mocobot team can cancel the gravitational force on the payload, implementing realistic weightless dynamics.

This combination of features in the proposed system is powerful, and initial experiments indicate that the system allows safe, effortless, dynamic, and intuitive manipulation of large, awkward, and articulated payloads by one or multiple human users. Other contributions include the design of a novel series elastic actuator (SEA)-actuated force-controlled parallel manipulator. Unlike most mobile manipulators that employ commercial robot arms, the proposed Omnid mocobot team is the first designed from the ground up for human-multi-mocobot collaborative manipulation, including significant mechanical compliance for human and pay load safety and high-fidelity active force control. As noted above, the proposed system is unique in its ability to render payloads weightless, allowing effortless, dynamic, and intuitive manipulation of large and articulated payloads.

Design considerations for a mocobot team are described below. Many existing mobile manipulators include a wheeled mobile base with one or more robot arms. When multiple mobile manipulators grasp a fragile payload, however, the safety of the load may be at risk due to mechanical overconstraint. The closed-loop kinematic constraints can be modeled by m holonomic constraints f(q)=0), where $q \in R^n$ is a set of generalized coordinates describing the configuration of the payload and the mobile manipulators. Wheeled robots may also be subject to k nonholonomic constraints of the form $H(q)\dot{q}=0$. The holonomic constraints can be differentiated and combined with the nonholonomic constraints to obtain a complete set of m+k Pfaffian constraints of the form $A(q) \dot{q}=0$, and the dynamics of the multirobot-pay load system can be written collectively in the form $$M(q)\ddot{q}+c(q,\dot{q})+p(q)=S(q)u(q)+A^T(q)\lambda,$$    Equation 1:

$$A(q)\dot{q}=0,$$    Equation 2:

where $M(q) \in R^{n \times n}$ is the combined mass matrix of the robots and the payload: $c(q, \dot{q}) \in R^n$ is a vector of Coriolis, centripetal, and possibly mechanical damping generalized forces: $p(q) \in R^n$ is a vector of generalized forces due to potential (e.g., gravity or springs): $u(q) \in R^{n_a}$ is the $n_a$ vector of robot control forces and torques produced by a feedback controller (which is typically at least a function of q): $S(q) \in R^{n \times n_a}$ is a transmission matrix mapping the controls to the generalized coordinates they act on: $A(q) \in R^{(m+k) \times n}$ represents the Pfaffian constraints; and $\lambda \in R^{m+k}$ is a set of generalized forces enforcing the constraints.

One goal of the feedback law u(q) is to minimize components of the constraint forces λ associated with the grasps, avoiding large compressive or tensile internal forces on the payload. The simplified dynamics of Equation 1 do not distinguish, however, between passive mechanical forces (e.g., p(q)) and the active feedback-controlled forces u(q), which are subject to limited bandwidth and possibly network latency. The nonidealities of active feedback control mean that incompatibilities of the motions of the end-effectors of the mocobots are absorbed by mechanical compliances in the robots or the payload itself. These mechanical compliances are often poorly understood, and a fragile payload may be damaged.

For the safety of the payload and human collaborators, mocobots are designed to implement well-characterized passive mechanical compliance. This compliance may be achieved by passive elements (e.g., springs) and/or actuators such as direct-drive actuators, series-elastic actuators (SEAs), variable stiffness actuators (VSAs), or variable impedance actuators (VIAs). With mechanical compliance, the end-effector of the $i^{th}$ mocobot exhibits a passive stiffness that can be locally linearized as $\delta F_i = K_i \delta X_i$, where the (possibly configuration-dependent) positive semi-definite stiffness matrix $K_i \in R^{6 \times 6}$ maps $\delta X_i \in R^6$ (a differential change in the exponential coordinates describing the configuration of the end-effector) to $\delta F_i \in R^6$ (a differential change in wrench), where $X_i$ and $F_i$ are expressed in a common end-effector frame. If N mocobots grasp a rigid payload, the total stiffness of the payload can be expressed in a common payload frame as:

$$K = \sum_{i=1}^{N} [Ad_{T_{ip}}]^T K_i [Ad_{T_{ip}}], \qquad \text{Equation 3:}$$

where $T_{ip} \in SE(3)$ expresses the configuration of the payload relative to the $i^{th}$ end-effector frame and $[Ad_{T_{ip}}]$ is the adjoint representation of $T_{ip}$.

A necessary condition for the safety of a payload to position perturbations at each end-effector is an upper bound on each end-effector's passive stiffness $K_i$ (e.g., on the maximum eigenvalue of $K_i$), and a necessary condition for the safety of a human interacting with the payload is an upper bound on the total stiffness K of the payload. Lower bounds on each end effector's stiffness may come from bandwidth requirements of some control modes (e.g., motion control).

Manipulability analysis can be used to understand which degrees-of-freedom of a payload that a mocobot team can control. Solving Equation 1 for $\ddot{q}$, substituting into a differentiated version of Equation 1, solving for the constraint forces $\lambda$, and eliminating $\lambda$ from Equation 1 yields:

$$\ddot{q} = F(q)u + g(q, \dot{q}), \qquad \text{Equation 4:}$$

where, after dropping the dependence on q for brevity, one is left with:

$$F = M^{-1}(I - A^T(AM^{-1}A^T)^{-1}AM^{-1})S. \qquad \text{Equation 5:}$$

The full configuration $q \in R^n$ can be decomposed as $q = [q_p^T q_r^T]^T$, where $q_p \in R^{n_p}$ and $q_r \in R^{n_r}$ are generalized coordinates of the payload and robots, respectively, and $n = n_p + n_r$. If the payload is a rigid body, then $n_p = 6$, and if the payload is articulated with d internal degrees of freedom, then $n_p = 6 + d$.

Accordingly, the matrix F(q) from Equation 5 becomes $$F(q) = \begin{bmatrix} F_p(q) \\ F_r(q) \end{bmatrix},$$

where $F_p(q) \in R^{n_p \times na}$ and $F_r(q) \in R^{n_r \times na}$. This matrix relating controls u to accelerations $\ddot{q}$ depends on the configuration of the payload $q_p$ and the robots' configuration $q_r$, which determines their grasp locations on the payload. One can define the linear manipulability of the payload at q as rank($F_p(q)$), the number of degrees of freedom of the payload that can be instantaneously independently controlled. It can be said that the payload is fully manipulable at q if rank($F_p(q)$) = $n_p$.

The mobile base of a mocobot ideally keeps its manipulator near the center of its workspace throughout the manipulation, for maximum control authority. One can assume the mobile base is motion controlled, perhaps imprecisely. For example, wheels may slip or skid, the footholds of a legged mobile base may be uncertain or yielding, and the ground may be uneven. Conversely, the mocobot is designed to be capable of predictable compliance and force control at its end-effector, effectively independent of the motion of the mobile base, for the safety of the human and the payload.

Thus the mechanical design and control of the mocobot should support reasonable decoupling between the force-controlled behavior visible at the end-effector and the potentially imprecise motion control of the mobile base. With this abstraction enforced by design and/or low-level control behaviors, mocobots of different designs (wheeled, tracked, legged, etc.) may implement the same high-level coordinated behaviors for human-collaborative and autonomous team manipulation. Included below is a description of how the Omnid mocobot effectively implements force control at its end-effector.

Figure 2:
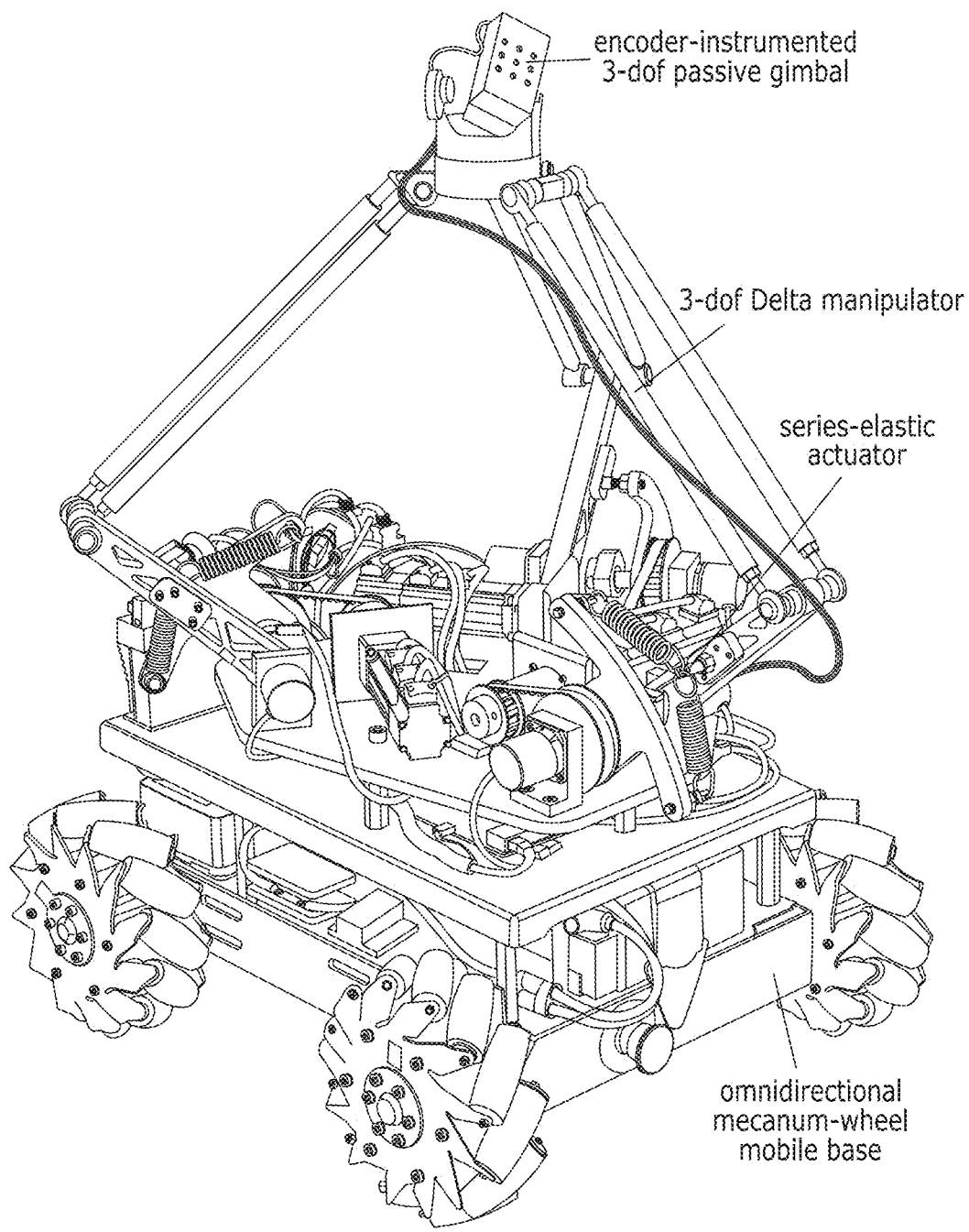
FIG. 2 depicts an Omnid mocobot that includes an omnidirectional mobile base, a 3-dof SEA-driven Delta parallel manipulator, and a 3-dof passive gimbal in accordance with an illustrative embodiment.

The Omnid mocobots are designed to approximately decouple the force-controlled behavior at the end-effector from imprecise motion control of the mobile base, exhibit well-characterized passive compliance, and, with a team of three or more, achieve full manipulability of payloads with up to three internal degrees of freedom. The Omnids are specifically designed for team manipulation, and in one embodiment a single Omnid is incapable of controlling all six degrees of freedom of a rigid payload. Each Omnid can include a mecanum-wheel omnidirectional mobile base and a 6-dof manipulator. The manipulator can be a 3-dof Delta parallel mechanism driven by SEAs plus an encoder-instrumented 3-dof passive gimbal "wrist." FIG. 2 depicts an Omnid mocobot that includes an omnidirectional mobile base, a 3-dof SEA-driven Delta parallel manipulator, and a 3-dof passive gimbal in accordance with an illustrative embodiment. In alternative embodiments, the mocobot can include fewer, additional, and/or different components.

Thus, in one embodiment, an Omnid has six independently-controlled degrees of freedom that include two translational degrees of freedom for the mobile base, one rotational degree of freedom for the mobile base, three actively-controlled linear degrees of freedom of the Delta manipulator, and three unactuated rotational freedoms at the wrist. With this design, each Omnid can apply three-dimensional linear forces that act on the payload at the center of each wrist. Assuming the end-effectors of the Omnids collaboratively manipulating a payload are not at the boundaries of their workspaces, the manipulability of the payload as a function of the number of Omnids grasping the payload is given in the table of FIG. 3A. Specifically, FIG. 3A depicts payload manipulability as a function of the number of Omnids grasping the payload and the configurations of their end-effectors in accordance with an illustrative embodiment. If the gimbal centers of three collaborating Omnids are not collinear, they can locally actuate all six degrees of freedom of a rigid payload, plus up to a maximum of three additional internal degrees of freedom of an articulated payload. If the gimbals of the Omnids are collinear, they cannot resist torque about the line. At such a singularity, the manipulability of a rigid payload drops to 5.

Figure 4:
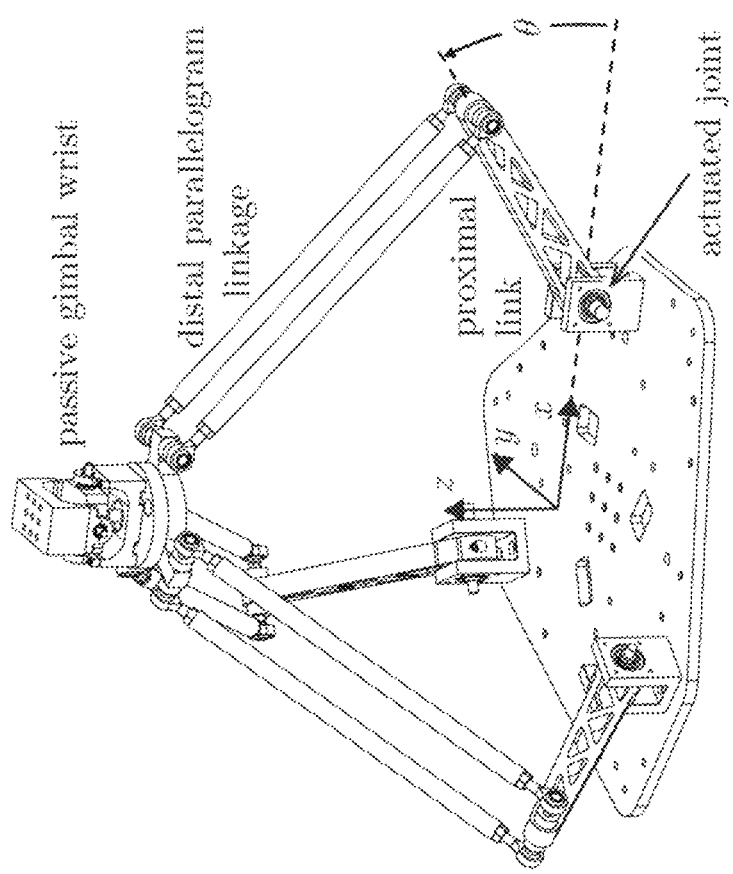
FIG. 4 depicts an Omnid manipulator in the form of an SEA-driven Delta parallel mechanism plus a passive gimbal wrist in accordance with an illustrative embodiment.

In one embodiment, the Omnid manipulator is formed as a Delta parallel manipulator plus a passive gimbal wrist. FIG. 4 depicts an Omnid manipulator in the form of an SEA-driven Delta parallel mechanism plus a passive gimbal wrist in accordance with an illustrative embodiment. The gimbal center is at x=(x, y, z) in the manipulator frame, which is centered between the actuated (proximal) joints. Each of the three legs supporting the Delta's end-effector includes a proximal revolute joint (driven by an SEA, described below) and a distal unactuated parallelogram linkage. Away from singularities of the mechanism, in the normal operating workspace of the wrist, the angles of the three proximal revolute joints $\theta = (\theta_1, \theta_2, \theta_3)$ map to the three translational coordinates x=(x, y, z) of the center of the gimbal wrist, expressed in a frame fixed to the manipulator's base, through the forward kinematics $x = h(\theta)$. The Jacobian $J(\theta) = \partial h / \partial \theta \in R^{3 \times 3}$ is full rank in this region and satisfies $\dot{x} = J(\theta)\dot{\theta}$ and $\dot{\theta} = J^{-1}(\theta)\dot{x}$. FIG. 3B is a table that depicts physical properties of the Omnid Delta manipulator and its theoretical position and force capabilities at the home configuration in accordance with an illustrative embodiment.

Figure 5:
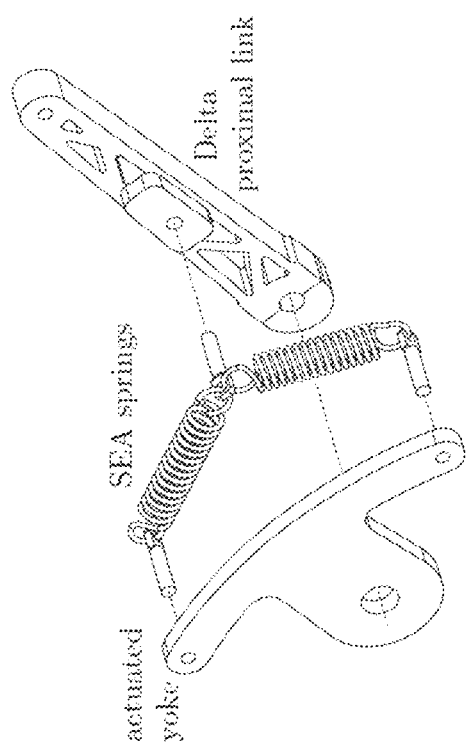
FIG. 5 depicts how the custom SEA at each proximal joint of the Delta manipulator includes a yoke drive by a geared motor and two antagonistic linear extension springs in accordance with an illustrative embodiment.
Figure 6:
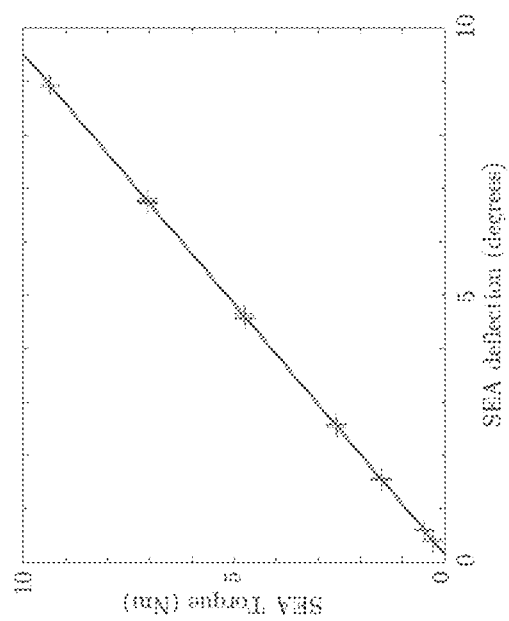
FIG. 6 depicts experimental SEA torque as a function of deflection (actuator angle minus the proximal joint angle) and a near-perfect linear fit to the data in accordance with an illustrative embodiment.

In an illustrative embodiment, each SEA includes a brake-equipped Applied Motion J0100-353-3-000 motor with a 40PE025 25:1 planetary gearhead, followed by a toothed 12:7 belt reduction driving a revolute joint coupled to the Delta's proximal revolute joint by two antagonistic linear extension springs. In alternative embodiments, different components may be used. FIG. 5 depicts how the custom SEA at each proximal joint of the Delta manipulator includes a yoke driven by a geared motor and two antagonistic linear extension springs in accordance with an illustrative embodiment. This setup creates a joint with a maximum continuous torque of approximately 9 Newton-meters (Nm) and a highly linear torsional stiffness, approximately k=60.1 Nm/radian. FIG. 6 depicts experimental SEA torque as a function of deflection (actuator angle minus the proximal joint angle) and a near-perfect linear fit to the data in accordance with an illustrative embodiment. Defining the matrix $K_\theta=\text{diag}(k, k, k)\in R^{3\times 3}$, the configuration-dependent linear stiffness at the gimbal wrist is $K(\theta)=J^{-T}(\theta)K_\theta J^{-1}(\theta)$. The maximum continuous end-effector force and the stiffness at the home configuration are given in the table of FIG. 3B.

The angles of the driving yoke and the Delta proximal joint (before and after the springs, respectively) are measured by one or more encoders, which can be Broadcom AS38-H39E-S13S 23-bit absolute encoders in one embodiment. In alternative embodiments, different encoders may be used. Joint torque is estimated by multiplying the joint stiffness by the angular difference between these joints, resulting in a theoretical resolution of approximately 45 micro Newton-meters (µNm). FIG. 3B shows the resulting end-effector position and force resolution at the home configuration. The accurate force sensing and control of the SEA Delta manipulator achieves the desired decoupling of end-effector forces from the motion of the mobile base.

The freely-rotating gimbal wrist prevents transmission of torques about the gimbal center. The three angles of the gimbal $\alpha=(\alpha_x, \alpha_y, \alpha_z)$ are measured by CUI AMT213AV capacitive 12-bit absolute encoders in one embodiment. If the end-effector is attached to a rigid payload, and the location of the end-effector frame relative to the payload frame is known, then the configuration of the payload relative to the Omnid's mobile base is known from the six encoders of the Delta and gimbal.

In an illustrative embodiment, the omnidirectional mobile base is a modified SuperDroid IG52-DB4 platform driven by four mecanum wheels. Alternatively, three mecanum wheels or omniwheels may be used. Each wheel is driven in velocity-control mode by an encoder-instrumented motor with a gearbox and belt drive. The encoders enable odometry which approximately tracks the incremental motion of the mobile base. For global positioning, an overhead camera can track the payload and/or mobile base, or the mobile base may be equipped with Intel T265 cameras, lidar, or other sensors. Global positioning is not needed for many collaborative manipulation modes, however. In an alternative embodiment, instead of wheels the omnidirectional base can include track(s), belt(s), or any other method of moving the base.

In an illustrative embodiment, each Omnid is equipped with one or more TM4C123GH6PM microcontrollers. Alternatively a different type of processor or microcontroller may be used. The Delta manipulator has a top-level microcontroller to perform kinematics and whole-arm control at 100 Hz, each SEA joint has its own microcontroller to implement low-level torque control at 800 Hz, and the gimbal has a microcontroller to measure the gimbal joint angles. The top-level Delta microcontroller communicates with the four other microcontrollers via dedicated RS-485 buses. In another illustrative embodiment, the mobile base uses three microcontrollers: one for the mobile base controller and one each for low-level control of the front and rear wheels, respectively. The top-level controller communicates with the wheel controllers via RS-485.

In an illustrative embodiment, the top-level Delta and mobile base microcontrollers communicate via RS-485 with an Intel NUC7i7BNH PC running Linux and the Robot Operating System (ROS), which handles Wi-Fi communication among robots and a base station. Control modes described herein can involve wired or wireless communication.

Figure 7:
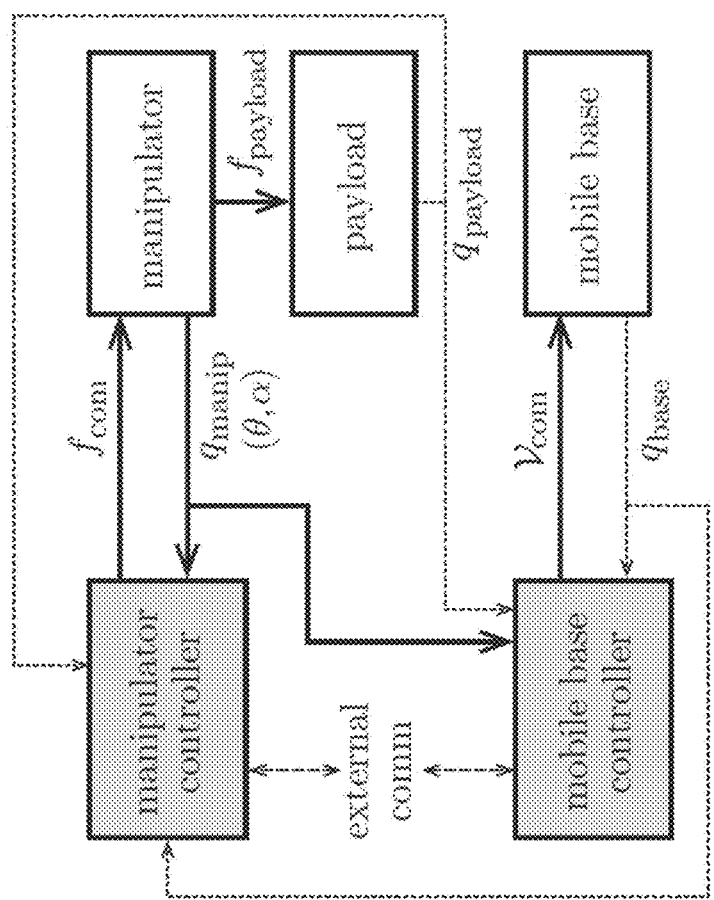
FIG. 7 is a block diagram that provides an overview of each Omnid's control system in accordance with an illustrative embodiment.

FIG. 7 is a block diagram that provides an overview of each Omnid's control system in accordance with an illustrative embodiment. In FIG. 7, the solid lines indicate communication channels used by the system. The dashed lines indicate optional wireless communication with a centralized controller or other Omnids. The dotted lines indicate optional exteroceptive sensing of the payload and mobile base configurations. The manipulator controller calculates a commanded end-effector force $f_{com}$ as a function of the manipulator's configuration $q_{manip}=(0, a)$ relative to the mobile base, and the mobile base controller calculates the commanded chassis-frame planar twist (linear and angular velocity) of the mobile base $V_{com}$ as a function of $q_{manip}$. With this architecture, the inventors have implemented several useful control behaviors for single Omnids and a collaborating team of Omnids. The two team behaviors that are described herein include payload float mode and approximate payload float mode, which are described in detail below.

In payload float mode, the Omnids balance the gravitational force acting on a rigid payload. Thus the human user(s) feel only the inertia of the payload, and are responsible only for the force to accelerate the weightless inertia. The magnitude of this force is typically dwarfed by the gravitational force. The manipulator and mobile base controllers that implement payload float mode are described below.

The robots use a manipulator controller for payload float mode. Specifically, each Omnid's manipulator implements active force control. The commanded end-effector force can be represented by the following equation:

$$f_{com}=f_{manip}+f_{pay}+f_{rest}\in R^3, \quad \text{Equation 6:}$$

where $f_{manip}$ is the force needed to cancel gravity on the manipulator itself, $f_{pay}$ is the additional force needed to cancel a portion of the payload's gravitational force, and $f_{rest}$ is a restoring force that pushes the end-effector toward the workspace center if it approaches a boundary. The SEA joint torques are calculated as $\tau=J^T(\theta)f_{com}$, and the Omnids use 800 Hz PID joint controllers to track the commanded torques.

Each of the terms of Equation 6 is described below. With respect to manipulator gravity compensation, the joint-space mass matrix of the manipulator is $M(\theta, \alpha)\in R^{3\times 3}$, which can be expressed in the (x, y, z) task space as $\Lambda(\theta, \alpha)=J^{-T}(\theta)M(\theta, \alpha)J^{-1}(\theta)$. The end-effector force $$f_{manip} = -\Lambda(\theta, \alpha) \begin{bmatrix} 0 \\ 0 \\ g \end{bmatrix}$$

is calculated to cancel the effect of the gravitational acceleration g in the z direction.

The payload gravity compensation is described next. To implement exact payload gravity compensation, each Omnid has to know the force component it is responsible for, based on its grasp location relative to the payload's center of mass and the orientation of the payload. In one implementation, the orientation of the payload is sensed by the gimbal wrist and it is assumed that the grasp location relative to the center of mass is known (each Omnid's grasp location relative to the payload's center of mass can be estimated by an initial calibration routine or specified directly). On startup, each Omnid measures the force it supports. That information, plus the payload orientation and grasp location, allows each Omnid to solve a statics problem to continually calculate its own $f_{pay}$ throughout manipulation.

With respect to workspace boundary repulsion, each Delta manipulator has a limited workspace. If the end-effector is within 2 centimeters (cm) of the boundary of a sphere conservatively inscribed in its workspace (FIG. 3B), a spring-like restoring force $f_{rest}$ pushes the end-effector toward the center of its workspace. This results in smooth degradation of payload gravity compensation when the manipulators approach their workspace boundaries.

Regarding the mobile base controller for payload float mode, the mobile base moves to keep the horizontal (x, y) coordinates of the wrist and the gimbal angle $\alpha_z$ near zero, ensuring maximum range of motion of the manipulator to implement force control. This "recentering control" may use a proportional-derivative (PD) controller to calculate a twist $V_{com} \in R^3$ to drive (x, y, $\alpha_z$) to zero.

The approximate payload float mode is used for payloads where exact gravity compensation is not possible because the center of mass is unknown or changing, possibly due to unmodeled internal articulation or flexibility. In this mode, mobile base control is identical to the recentering control of the payload float mode, but the manipulator controller of Equation 6 is altered to:

$$f_{com} = f_{manip} + f'_{pay} + f_{spring} + f_{rest} \in R^3, \quad \text{Equation 7:}$$

where $f_{pay}$ of Equation 6 is replaced by the terms $f'_{pay} + f_{spring}$. These two terms are explained below:

On startup, each Omnid measures the height of its manipulator $z_0$ and the gravitational load on its manipulator due to the payload $-f'_{pay}$. Throughout the rest of the manipulation, the manipulator provides a constant nominal force $f'_{pay}$, which provides exact payload gravity compensation if the Omnids maintain their relative configuration. Since the Omnids will move, the term $f_{spring} = c(z_0 - z)$, c>0, pulls each Omnid manipulator toward the set height $z_0$, to prevent imperfect gravity compensation from causing the payload to drift to the boundaries of the end-effector workspaces. If $|z_0 - z|$ exceeds a threshold $\epsilon$, the set height $z_0$ is changed to maintain $|z_0 - z| \le \epsilon$. This allows the user to drag the payload to a new nominal height at each Omnid, similar to dragging an object over a surface with Coulomb friction by pulling with a spring. Other controllers that have been implemented on the Omnids include end-effector impedance control, end-effector motion control, and mobile base trajectory-tracking control.

The inventors have validated and tested the proposed system, including SEA performance. With respect to static torque measurement accuracy, static load tests of the SEA indicate that the worst-case error in torque measurement is ±2% of the full-scale continuous torque range of ±9 Nm. Regarding static torque measurement precision, any change in torque of 0.01 Nm (0.1% full scale) or greater is reliably detected.

Figure 8:
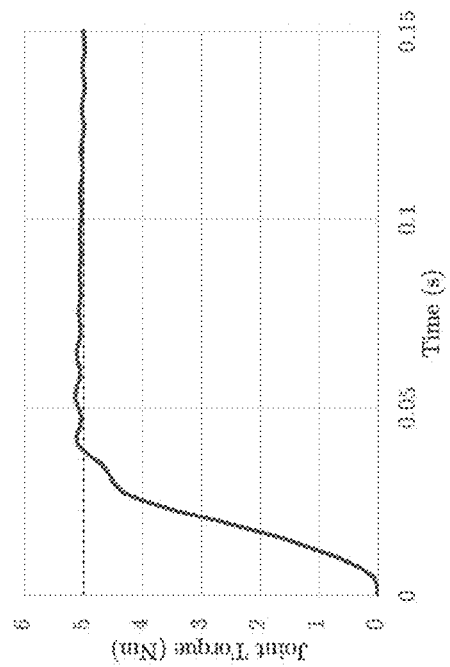
FIG. 8 shows the measured 5 Nm step response of a single SEA for a blocked proximal link in accordance with an illustrative embodiment.
Figure 9:
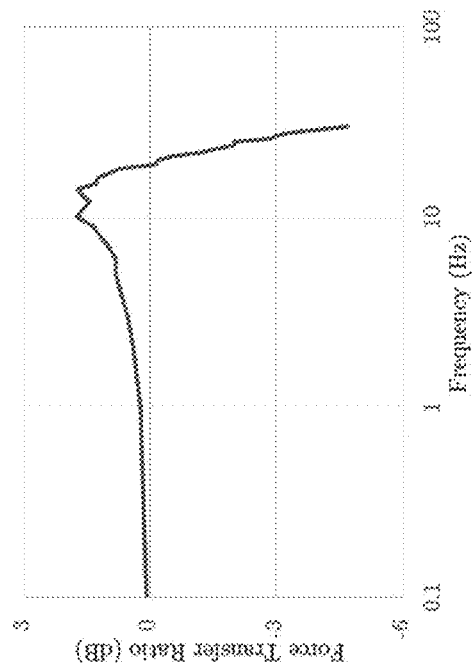
FIG. 9 shows the frequency response to oscillating torque commands about a 5 Nm DC offset in accordance with an illustrative embodiment.

With respect to SEA torque control step and frequency response, FIG. 8 shows the measured 5 Nm step response of a single SEA for a blocked proximal link in accordance with an illustrative embodiment. The step response settling time to the desired torque of 5 Nm is less than 0.1 s. FIG. 9 shows the frequency response to a sinusoidal desired torque of +/±1 Nm about a 5 Nm DC offset in accordance with an illustrative embodiment. Under these conditions, the bandwidth is between 20 and 30 Hz. Single-Omnid experiments were also performed. Static load tests using weights at the end-effector of an Omnid indicate a worst-case force-sensing error of ±2% relative to the manipulator's maximum continuous force of ±90 Newtons (N) at the home configuration.

Figure 10A:
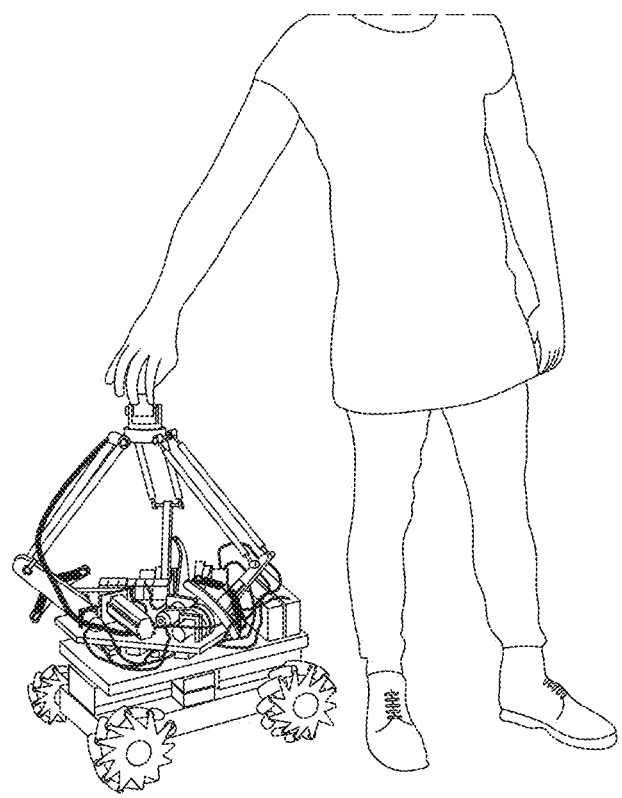
FIG. 10A is a first view of Omnid "walk the dog" behavior, where the manipulator implements manipulator gravity compensation and the mobile base implements recentering control in accordance with an illustrative embodiment.
Figure 10B:
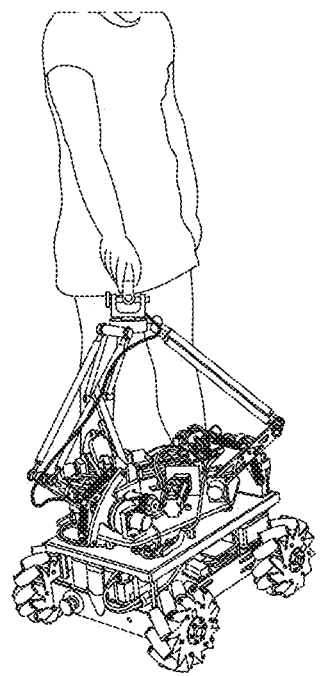
FIG. 10B is a second view of Omnid "walk the dog" behavior, where the manipulator implements manipulator gravity compensation and the mobile base implements recentering control in accordance with an illustrative embodiment.

Ideally, when running mobile base recentering control and controlling the end-effector to support its own weight, the end-effector would begin to move in response to any non-zero applied force. In practice, friction causes a deadband where no motion occurs. With the manipulator near its home configuration and a payload of approximately 5 kilograms (kg), motion typically occurs at less than 1 N of applied force. FIG. 10A is a first view of Omnid "walk the dog" behavior, where the manipulator implements manipulator gravity compensation and the mobile base implements recentering control in accordance with an illustrative embodiment. FIG. 10B is a second view of Omnid "walk the dog" behavior, where the manipulator implements manipulator gravity compensation and the mobile base implements recentering control in accordance with an illustrative embodiment. In these use scenarios, the human is able to reposition the mobile base using only a light touch at the unactuated gimbal.

Multi-Omnid single-human assembly of a rigid payload was also tested. In this experiment (FIG. 1), a single human and three Omnids collaboratively manipulate a rigid PVC pipe assembly weighing 15.6 kg, which is significantly more than a single Omnid's 9 kg capacity at the manipulator's home configuration. The Omnids run the payload float mode, making the pipes feel weightless to the human. In a 6-dof assembly task, where two pipes are inserted into holes with a 2 millimeter (mm) tolerance, insertion is accomplished easily, dynamically, and intuitively with small operator forces. Contact forces between the payload and the stationary fixture are felt directly by the human user, providing intuitive haptic feedback to correct errors during the insertion process.

Figure 11:
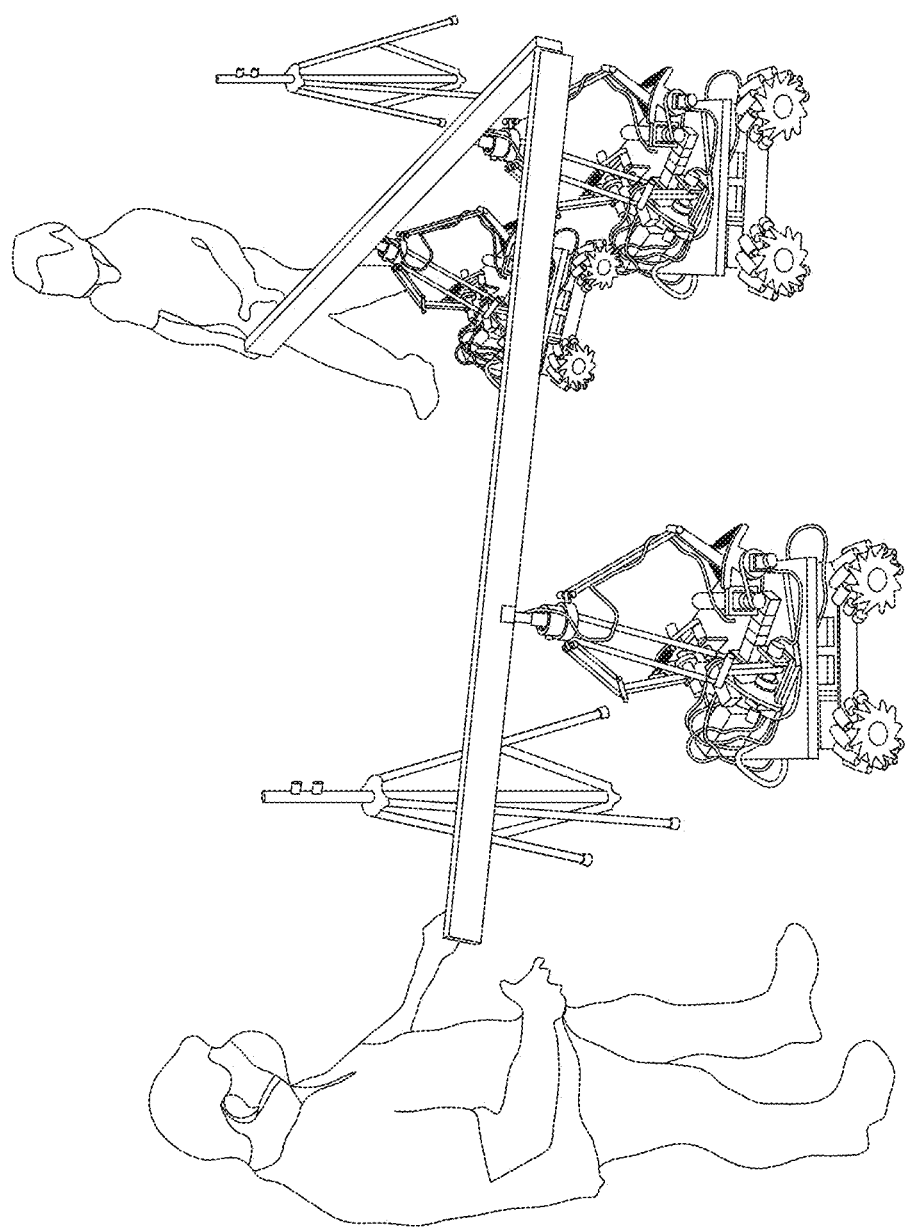
FIG. 11 shows two humans and three Omnids collaboratively manipulating an articulated payload among obstacles in accordance with an illustrative embodiment.

Multi-Omnid and multi-human manipulation of an articulated payload was also performed. FIG. 11 shows two humans and three Omnids collaboratively manipulating an articulated payload among obstacles in accordance with an illustrative embodiment. The payload has seven total degrees of freedom: six for one rigid body and one for the hinge joint. Three Omnids are sufficient to autonomously manipulate this payload (FIG. 3A), but a singularity occurs if the three wrists are brought into alignment: the Omnids cannot generate a torque about the line, so the human operators provide it. In this task, the Omnids implement approximate payload float mode, since the payload's center of mass is unknown and changing due to the payload's unmodeled articulation. The experiments show that one or two human operators can easily and dynamically control all seven degrees of freedom of the articulated payload.

In the proof-of-concept demonstrations of collaborative manipulation in payload float mode, it was found that new users required no training to manipulate large pay loads effortlessly and fluidly. Because the interaction is direct, physical, and familiar, no new mental mappings need to be learned, resulting in insignificant cognitive loading relative to most forms of teleoperation. The gravity cancellation provided by the Omnids simply allows users to apply drastically smaller forces to manipulate the payload.

When the payload is an approximately rigid body, and the mobile manipulator robot end-effectors grasp the payload at unknown positions and orientations relative to each other, it is possible, during the course of manipulation of the rigid payload, for the robots to estimate the positions and orientations of their end-effectors relative to each other. Let $\{a\}$ and $\{b\}$ be coordinate frames at the end-effectors of two different mobile manipulator robots when they are attached to the common payload. Define $T_{ab}$ to be the unknown 4×4 homogeneous transformation matrix representing the configuration of the $\{b\}$ frame in the $\{a\}$ frame. The 6-dimensional twist (angular and linear motion) of frame $\{a\}$, expressed in the $\{a\}$ frame, at some instant of time is $V_a$, and the 6-dimensional twist of frame $\{b\}$, expressed in the $\{b\}$ frame, at the same instant is $V_b$. The two are related by the equation $V_a = [Ad_{T_{ab}}] V_b$, where $[Ad_{T_{ab}}]$ is the 6×6 adjoint matrix representation of $T_{ab}$. Assuming each robot can sense the twist of its own end-effector, then a set of N simultaneously sensed pairs $\{(V_{a1}, V_{b1}), (V_{a2}, V_{b2}), \ldots, (V_{aN}, V_{bN})\}$ can be used to estimate $T_{ab}$ by least-squares estimation, provided the set of observations is rich enough (e.g., the twists include rotational motion). This computation may be performed by a central computer with which the robots communicate, or by each robot if the robots communicate directly with each other.

After estimating the relative positions and orientations of each end-effector frame on the rigid payload, the robots can estimate the mass and location of the center of mass of the payload relative to end-effector frames by measuring the force at each end-effector when the payload is held stationary at two or more different orientations which are not simply rotations about an axis aligned with gravity. This estimation is a statics problem that can be solved by least squares. This computation may be performed by a central computer with which the robots communicate, or by each robot if the robots communicate directly with each other.

Each mobile manipulator robot is capable of measuring the force, configuration, twist, and acceleration at its end-effector. When multiple end-effectors are in contact with a rigid payload, then sets of simultaneous observations of each end-effector's force, configuration, twist, and acceleration, coupled with the Newton-Euler equations of rigid body dynamics, are sufficient to estimate the 3×3 inertia matrix of the rigid payload by least squares, provided the set of observations is rich enough. This computation may be performed by a central computer with which the robots communicate, or by each robot if the robots communicate directly with each other.

Figure 12:
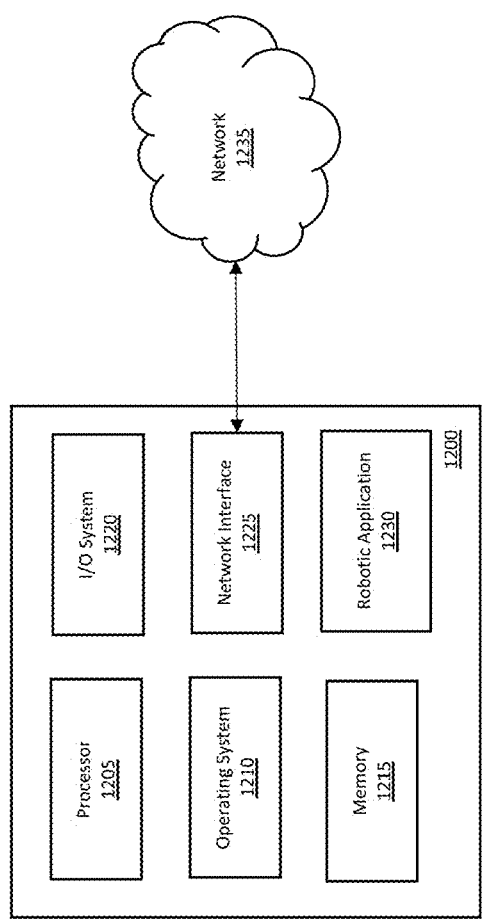
FIG. 12 depicts a computing device in direct or indirect communication with a network in accordance with an illustrative embodiment.

In an illustrative embodiment and as discussed above, the proposed system can include one or more computing devices or systems that are configured to perform any of the operations described herein. FIG. 12 depicts a computing device 1200 in direct or indirect communication with a network 1235 in accordance with an illustrative embodiment. The computing device 1200 can be incorporated into the mocobots described herein, or alternatively can be implemented as a standalone controller computer. In alternative embodiments, the computing device 1200 may be in direct communication with another computer (as opposed to networked communication) such as a cell phone, tablet, laptop computer, another robotic device, etc.

The computing device 1200 includes a processor (or microcontroller) 1205, an operating system 1210, a memory 1215, an input/output (I/O) system 1220, a network interface 1225, and a robotic application 1230. In alternative embodiments, the computing device 1200 may include fewer, additional, and/or different components. The components of the computing device 1200 communicate with one another via one or more buses or any other interconnect system.

The processor 1205 of the computing device 1200 can be in electrical communication with and used to control any of the system components described herein, such as manipulators, the mobile platform, actuators, encoders, etc. The processor 1205 can be any type of computer processor known in the art, and can include a plurality of processors and/or a plurality of processing cores. The processor 1205 can include a controller, a microcontroller, an audio processor, a graphics processing unit, a hardware accelerator, a digital signal processor, etc. Additionally, the processor 1205 may be implemented as a complex instruction set computer processor, a reduced instruction set computer processor, an x86 instruction set computer processor, etc. The processor 1205 is used to run the operating system 1210, which can be a custom operating system specific to the requirements of the proposed system.

The operating system 1210 is stored in the memory 1215, which is also used to store programs, robotic data, data regarding objects to be manipulated (e.g., mass, dimensions, etc.), algorithms, network and communications data, peripheral component data, and other operating instructions. The memory 1215 can be one or more memory systems that include various types of computer memory such as flash memory, random access memory (RAM), dynamic RAM, static RAM, a universal serial bus (USB) drive, an optical disk drive, a tape drive, an internal storage device, a non-volatile storage device, a hard disk drive (HDD), a volatile storage device, a solid state drive, etc.

The I/O system 1220, or user interface, is the framework which enables users (and peripheral devices) to interact with the computing device 1200. The I/O system 1220 can include one or more keys or a keyboard, one or more buttons, one or more displays, a speaker, a microphone, etc. that allow the user to interact with and control the computing device 1200. The I/O system 1220 also includes circuitry and a bus structure to interface with peripheral computing components such as power sources, sensors, etc.

The network interface 1225 includes transceiver circuitry that allows the computing device 1200 to transmit and receive data to/from other devices such as user device(s), remote computing systems, other robots, servers, websites, etc. The network interface 1225 enables communication through the network 1235, which can be one or more communication networks. The network 1235 can include a cable network, a fiber network, a cellular network, a wi-fi network, a landline telephone network, a microwave network, a satellite network, etc. The network interface 1225 also includes circuitry to allow device-to-device communication such as near field communication (NFC), Bluetooth® communication, etc.

The robotic application 1230 can include hardware, software, and algorithms (e.g., in the form of computer-readable instructions) which, upon activation or execution by the processor 1205, performs any of the various operations described herein such as controlling a motor, controlling actuators, manipulating wrists, controlling the mobile platform, activating and controlling encoders, receiving sensed data, performing analyses of sensed data, generating control signals, transmitting test result data for remote processing, etc. The robotic application 1230 can utilize the processor 1205 and/or the memory 1215 as discussed above.

Thus, described herein is the concept of a mocobot team and its design requirements, including passive compliance, payload manipulability, and manipulation force control decoupled from mobile base motion control. The inventors also introduced the design and control of a team of Omnid mocobots which meet the design requirements, and initial experiments indicate that their payload float modes allow one or more humans to easily, dynamically, and intuitively manipulate large, awkward, and articulated payloads. The proposed Omnids are the first robotic system to implement significant passive compliance and three-dimensional force-controlled weightlessness for human-multirobot collaborative mobile manipulation. The Omnids are a platform for evaluating controllers for human-multirobot collaborative manipulation.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A robot system comprising:
   a plurality of mobile manipulator robots, wherein each mobile manipulator robot includes:
   a mobile robot base;
   a robot manipulator mounted to the mobile robot base, wherein the robot manipulator includes a Delta robot, and wherein each actuated joint of each Delta robot is driven by a series-elastic actuator; and
   one or more computers in communication with the mobile robot base and the robot manipulator, wherein the one or more computers are configured to simultaneously:
   coordinate motion control of the mobile robot base and force control of the robot manipulator to manipulate a payload in cooperation with other mobile manipulator robots of the plurality; and
   collaborate with zero, one, or a plurality of human users that are in contact with the payload.

2. The robot system of claim 1, wherein each series-elastic actuator includes a pair of antagonistic springs connecting an actuator-driven yoke to a link of the Delta manipulator.

3. The robot system of claim 1, wherein an encoder-instrumented unactuated gimbal with three degrees of freedom is mounted to the Delta robot.

4. The robot system of claim 1, wherein each mobile robot base comprises a wheeled robot base.

5. The robot system of claim 4, wherein the wheeled robot base comprises an omnidirectional wheeled robot base.

6. The robot system of claim 1, wherein the mobile manipulator robots communicate wirelessly with each other or a central control station.

7. The robot system of claim 1, wherein each mobile robot base is configured to sense its position and orientation.

8. A robot manipulator comprising:
   a Delta robot, wherein each actuated joint of the Delta robot is driven by an actuator incorporating one or more spring elements;
   one or more computers in communication with the Delta robot and configured to measure and control translational forces in a frame fixed to a moving output platform of the Delta robot; and
   an encoder-instrumented unactuated gimbal with three degrees of freedom mounted to the moving output platform of the Delta robot.

9. The robot manipulator of claim 8, further comprising a mobile robot base to which the Delta robot is mounted.

10. The robot manipulator of claim 9, wherein the mobile robot base is an omnidirectional wheeled mobile robot.

11. A method of controlling a plurality of mobile manipulator robots, the method comprising simultaneously achieving, by a computing system, a desired linear force in a frame fixed to an output platform of a Delta robot while driving a mobile base to keep the output platform of the Delta robot as close as possible to a center of a workspace in which the Delta robot is operating.

12. The method of claim 11, further comprising determining, by the computing system, forces to be applied to a payload by the plurality of mobile manipulator robots collectively to cause the payload to feel weightless to one or more human users contacting the payload.

13. The method of claim 11, further comprising collectively estimating, by the mobile manipulator robots, a mass and one or more inertial properties of a payload that is to be manipulated.

14. The method of claim 11, wherein the computing system comprises a central control station.

15. The method of claim 11, further comprising determining, by one or more sensors and the computing system, a position and an orientation of the mobile base.

16. The method of claim 15, wherein the encoder-instrumented unactuated gimbal has three degrees of freedom.

17. The method of claim 11, wherein each actuated joint of each Delta robot is driven by a series-elastic actuator.

* * * * *